(12) United States Patent
Mazzone

(10) Patent No.: US 10,817,689 B2
(45) Date of Patent: Oct. 27, 2020

(54) SYSTEMS AND METHODS FOR A SCAN ENGINE COUPLED TO A FINGER MOUNT

(71) Applicant: DATALOGIC IP TECH, S.r.l., Bologna (IT)

(72) Inventor: Claudio Mazzone, Bologna (IT)

(73) Assignee: Datalogic IP Tech, S.r.l., Bologna (IT)

( * ) Notice: Subject to any disclaimer, the term of this patent is extended or adjusted under 35 U.S.C. 154(b) by 26 days.

(21) Appl. No.: 15/851,267

(22) Filed: Dec. 21, 2017

(65) Prior Publication Data
US 2019/0197273 A1 Jun. 27, 2019

(51) Int. Cl.
G06K 7/10 (2006.01)
G06K 7/14 (2006.01)

(52) U.S. Cl.
CPC ..... G06K 7/10891 (2013.01); G06K 7/10396 (2013.01); G06K 7/10772 (2013.01); G06K 7/1413 (2013.01); G06K 7/1417 (2013.01); G06K 2007/10524 (2013.01); G06K 2007/10534 (2013.01)

(58) Field of Classification Search
CPC combination set(s) only.
See application file for complete search history.

(56) References Cited

U.S. PATENT DOCUMENTS

| | | | | |
|---|---|---|---|---|
| 4,766,299 A | * | 8/1988 | Tierney | G06K 7/10891 235/462.21 |
| 4,935,610 A | * | 6/1990 | Wike, Jr. | G06K 7/10891 235/462.35 |
| 5,070,293 A | * | 12/1991 | Ishii | G06K 7/10881 320/108 |
| 5,132,523 A | * | 7/1992 | Bassett | G06K 7/10871 235/455 |
| 5,191,197 A | * | 3/1993 | Metlitsky | G06K 7/10564 235/462.44 |
| 5,268,564 A | * | 12/1993 | Metlitsky | G06K 7/10851 235/462.48 |
| 5,305,181 A | * | 4/1994 | Schultz | B60R 11/02 361/679.03 |
| 5,329,106 A | * | 7/1994 | Hone | G06K 7/10891 235/462.44 |
| 5,340,972 A | * | 8/1994 | Sandor | G06K 7/10564 235/462.44 |
| 5,410,140 A | * | 4/1995 | Bard | G06F 1/163 235/462.33 |

(Continued)

*Primary Examiner* — Daniel I Walsh
(74) *Attorney, Agent, or Firm* — Cozen O'Connor

(57) ABSTRACT

Systems and methods for a machine-readable symbol reader that includes a scan engine, a finger mount, and a wrist mount. The scan engine couples to and moves with the finger mount, which is sized and dimensioned to accommodate at least a portion of one or more fingers. The wrist mount accommodates at least a portion of a wrist and releasably secures the wrist mount to the wrist. The wrist mount includes an electrical interface to a power source. A flexible substrate extends between the finger mount and the wrist mount, and may carry one or more electrically conductive paths that extend between the wrist mount and at least one of the finger mount and the scan engine to provide power from the power source to the scan engine. The finger mount may include a user input device to trigger the scan engine to scan within the field of view.

22 Claims, 6 Drawing Sheets

(56) References Cited

U.S. PATENT DOCUMENTS

| | | | | |
|---|---|---|---|---|
| 5,422,469 A | * | 6/1995 | Bard | G06K 7/10584 235/462.33 |
| 5,543,610 A | * | 8/1996 | Bard | G06F 1/163 235/462.44 |
| 5,610,386 A | * | 3/1997 | Ball | G06K 7/10891 235/412 |
| 5,610,387 A | * | 3/1997 | Bard | G04B 47/00 235/462.44 |
| 5,675,138 A | * | 10/1997 | La | G06K 7/10891 235/462.44 |
| 5,793,032 A | * | 8/1998 | Bard | G04B 37/0016 235/462.15 |
| 6,010,071 A | * | 1/2000 | Bard | G06F 1/163 235/462.43 |
| 6,286,760 B1 | * | 9/2001 | Schmidt | G06K 7/10801 235/462.32 |
| 6,607,134 B1 | * | 8/2003 | Bard | G04B 47/00 235/462.44 |
| 7,111,786 B2 | * | 9/2006 | Schmidt | G06K 7/10 235/462.45 |
| 7,140,546 B1 | * | 11/2006 | Terlizzi | G06K 7/10881 235/472.01 |
| 7,331,817 B1 | * | 2/2008 | Morris | G09B 21/006 439/37 |
| 9,092,684 B1 | * | 7/2015 | Sundaram | G06K 7/10891 |
| 9,100,493 B1 | * | 8/2015 | Zhou | H04M 1/72522 |
| 9,349,047 B2 | | 5/2016 | Fiorini et al. | |
| 9,740,906 B2 | * | 8/2017 | AlNasser | G06K 7/10891 |
| 9,864,887 B1 | * | 1/2018 | Ngo | G06K 7/10891 |
| 10,014,709 B2 | * | 7/2018 | Herrmann | H02J 7/025 |
| 10,439,411 B2 | * | 10/2019 | Narayanasamy | H02J 7/0045 |
| 2002/0023960 A1 | * | 2/2002 | Knowles | G06K 7/10792 235/472.01 |
| 2002/0024500 A1 | * | 2/2002 | Howard | G06F 3/014 345/158 |
| 2002/0044058 A1 | * | 4/2002 | Heinrich | G06K 7/0008 340/572.1 |
| 2002/0063159 A1 | * | 5/2002 | Wilz, Sr. | G06K 7/10693 235/462.31 |
| 2002/0092913 A1 | * | 7/2002 | Bard | G04B 37/0016 235/472.02 |
| 2002/0113129 A1 | * | 8/2002 | Metlitsky | G06K 7/10564 235/462.44 |
| 2004/0222301 A1 | * | 11/2004 | Willins | G02B 26/105 235/472.01 |
| 2006/0108425 A1 | * | 5/2006 | Wiklof | G06K 7/10891 235/462.44 |
| 2006/0145663 A1 | * | 7/2006 | Shiff | H01R 13/6205 320/125 |
| 2008/0078839 A1 | * | 4/2008 | Barkan | G06K 7/10554 235/470 |
| 2008/0087734 A1 | * | 4/2008 | Wang | G06K 7/10891 235/472.01 |
| 2008/0182442 A1 | * | 7/2008 | Choi | H01R 13/642 439/166 |
| 2008/0296139 A1 | * | 12/2008 | Morris | G06K 7/10881 200/502 |
| 2009/0266898 A1 | * | 10/2009 | Miller | G06K 7/0004 235/472.01 |
| 2010/0001076 A1 | * | 1/2010 | Wulff | G06K 17/0022 235/472.02 |
| 2012/0187192 A1 | * | 7/2012 | Lee | G06K 7/10891 235/462.44 |
| 2013/0301925 A1 | * | 11/2013 | Nashida | G06T 11/60 382/195 |
| 2013/0310631 A1 | * | 11/2013 | Lee | H01M 10/425 340/1.1 |
| 2014/0249944 A1 | * | 9/2014 | Hicks | G06Q 30/0281 705/17 |
| 2014/0362587 A1 | * | 12/2014 | An | A45C 11/00 362/311.02 |
| 2015/0008869 A1 | * | 1/2015 | Youn | H02J 7/0042 320/107 |
| 2015/0137731 A1 | * | 5/2015 | Kim | H02J 7/355 320/101 |
| 2015/0278570 A1 | * | 10/2015 | Van Horn | H01Q 1/2283 235/472.01 |
| 2016/0034055 A1 | * | 2/2016 | Utykanski | G06F 3/03545 235/462.13 |
| 2016/0259958 A1 | * | 9/2016 | Nara | G06K 7/10722 |
| 2016/0378193 A1 | * | 12/2016 | Camacho Perez | G06F 3/017 345/156 |
| 2017/0033567 A1 | * | 2/2017 | Adamisin | H02J 7/025 |
| 2017/0108895 A1 | * | 4/2017 | Chamberlin | H04M 1/04 |
| 2017/0286729 A1 | * | 10/2017 | AlNasser | G06K 7/10009 |
| 2017/0317444 A1 | * | 11/2017 | Narayanasamy | H01R 13/6205 |
| 2018/0012049 A1 | * | 1/2018 | Ngo | G06K 7/10891 |
| 2018/0175643 A1 | * | 6/2018 | Shim | H02J 7/0042 |
| 2019/0196535 A1 | * | 6/2019 | Paufler | G06F 3/0346 |
| 2019/0197273 A1 | * | 6/2019 | Mazzone | G06K 7/10891 |
| 2020/0022433 A1 | * | 1/2020 | Lu | G06K 7/10396 |

* cited by examiner

SYSTEMS AND METHODS FOR A SCAN ENGINE COUPLED TO A FINGER MOUNT

TECHNICAL FIELD

The present disclosure relates to machine-readable symbol readers that may include a scan engine coupled to a finger mount and a finger mount to which a selectively releasable power source may be coupleable.

BACKGROUND

Description of the Related Art

Machine-readable symbol readers may be used in a variety of environments to scan items or other objects. For example, in some instances, the machine-readable symbol readers may be used in warehouse and logistics environments. These machine-readable symbol readers are used to read various types of machine-readable symbols carried by, inscribed on, or otherwise borne by various types of items or objects, or even humans and other animals. The machine-readable symbols typically take the form of either one-dimensional machine-readable symbols (e.g., barcode symbols) or two-dimensional machine-readable symbols (e.g., area or matrix code symbols). Machine-readable symbols are based on machine-readable symbologies (e.g., Code 39, Code 128, EAN13, Code 93, DataMatrix, PDF 417, QR Code) which define respective mappings between areas of high and low reflectance and human understandable characters (e.g., alphanumeric, extended ASCII).

BRIEF SUMMARY

The machine-readable symbol reader may include a scan engine and a power source. In some instances the scan engine may be attached to a finger mount that may be mountable on a finger of a user. In such implementation, the power source may be attached to a wrist mount that may be mountable on a wrist of the user. In such instances, the wrist mount may be electrically and communicatively coupled to the scan engine and/or the finger mount via one or more electrically conductive paths. In order to prevent exposed electrically conductive wires from becoming caught on objects as the hand and arm of the user moves, various embodiments described herein employ a substrate which extends between the finger mount and the wrist mount, and which carries one or more electrically conductive paths (e.g., electrically conductive wires, electrically conductive circuit traces). In order to protect against damage as a power source impacts objects as the arm of the user moves around, a wrist mount may include a magnetically attractive coupler or mount, to removably attach the power source to the wrist mount.

A machine-readable symbol reader may be summarized as including a scan engine; a finger mount, the scan engine coupled to the finger mount for movement therewith, the finger mount sized and dimensioned to accommodate at least a portion of one or more fingers therein and to releasably secure the scan engine to the one or more fingers; a wrist mount sized and dimensioned to accommodate at least a portion of a wrist therein and to releasably secure the wrist mount to the wrist, the wrist mount including an electrical interface to a power source, the wrist mount including a number of couplers that are operable to detachably physically couple the power source to the wrist mount and to selectively physically de-couple the power source to the wrist mount when a force above a defined amount is applied to the power source; and a flexible substrate, the flexible substrate carrying one or more electrically conductive paths that extend between the wrist mount and at least one of the finger mount and the scan engine at least to provide power from the power source to the scan engine. One or more of the number of couplers of the wrist mount may include one or more magnetic couplers positioned and magnetically oriented to couple with a set of complimentary magnetic couplers carried by the power source. The one or more magnetic couplers of the wrist mount may include one or more magnets or one or more pieces of ferrous metal. The one or more magnetic couplers of the wrist mount may include one or more electromagnets, the electromagnets selectively activatable and deactivatable.

The machine-readable symbol reader may further include the power source, where in the power comprises a first battery, the first battery having a size and dimension, the first battery selectively, detachably coupleable to the wrist mount via one or more of the number of couplers. The power source may include a second battery, the second battery having a size and dimension, the size and dimension of the second battery different from the size and dimension of the first battery, the first battery and the second battery may each be selectively, detachably coupleable to the wrist mount. The first battery may include a display which presents information based upon one or more signals received at the display. The first battery may include a first surface and a second surface, the second surface separated from the first surface by a width of the first battery, the second surface facing towards the wrist mount when the first battery is coupled to the wrist mount, and the display may be located along the first surface. The number of couplers on the wrist mount may include at least one of snaps, latches, Velcro, apertures, or posts. The flexible substrate may include at least one of a flexible printed circuit board or a flexible textile. The one or more electrically conductive paths carried by the flexible substrate may include one or more of electrically conductive wires, insulated electrically conductive wires, or electrically conductive traces.

The machine-readable symbol reader may further include a decoding subsystem, the decoding subsystem communicatively coupled to the scan engine, the decoding subsystem receiving one or more signals from the scan engine, the one or more signals related to an image of a machine-readable symbol that encodes information, the decoding subsystem operable to decode the information encoded by the machine-readable symbol.

The machine-readable symbol reader may further include a wireless transmission subsystem, the wireless transmission subsystem communicatively coupled to the decoding subsystem and to a remote processor, the wireless transmission subsystem receiving one or more signals from the decoding subsystem, the one or more signals related to the decoded information decoded by the decoding subsystem, the wireless transmission subsystem wirelessly transmitting the decoded information to the remote processor. Each of the decoding subsystem and the wireless transmission subsystem may be physically coupled to the finger mount. The decoding subsystem may be physically coupled to the finger mount.

The machine-readable symbol reader may further include an accelerometer, the accelerometer generating one or more signals based upon movement of the accelerometer, the accelerometer physically coupled to the wrist mount to move therewith; and a controller, the controller communicatively coupled to the accelerometer and to the one or more electromagnets, the controller receiving the one or more signals generated by the accelerometer, and transmitting one or more signals to the one or more electromagnets based at least upon the one or more signals received from the accelerometer, the one or more signals transmitted to the one or more electromagnets which trigger each of the one or more electromagnets to deactivate.

The finger mount may further include a user input device, the user input device transmitting a signal when activated by a user, and the machine-readable symbol reader may further include a controller, the controller communicatively coupled to the user input device and to the scan engine, the controller upon receiving the signal from the user input device, transmitting one or more signals to the scan engine, the one or more signals transmitted to the scan engine which trigger the scan engine to capture one or more images within a field-of-view of the scan engine. The user input device may be located along a first surface of the finger mount, the first surface facing a first finger of a user when the finger mount is mounted on a second finger of the user, the first finger adjacent to the second finger.

The machine-readable symbol reader may further include a presence sensor, the presence sensor having a field-of-view, the presence sensor generating one or more signals upon detecting an object within the field-of-view; and a controller, the controller communicatively coupled to the presence sensor and to the scan engine, the controller upon receiving the one or more signals from the presence sensor, transmitting one or more signals to the scan engine, the one or more signals transmitted to the scan engine triggering the scan engine to capture one or more images within a field-of-view of the scan engine. The finger mount may be sized and dimensioned to receive a portion of a single finger therethrough. The flexible substrate may be a glove or a portion of a glove. The finger mount may be comprised of a ring, the ring including a platform along which the scan engine is securely, detachably, physically coupled, the ring sized and dimensioned to receive a finger of a user.

A method of operation of a machine-readable symbol reader, the machine-readable symbol reader including a scan engine, a finger mount to which the scan engine couples for movement therewith, the finger mount sized and dimensioned to accommodate at least a portion of one or more fingers therein and to releasably secure the scan engine to the one or more fingers, a wrist mount sized and dimensioned to accommodate at least a portion of a wrist therein and to releasably secure the wrist mount to the wrist, the wrist mount including an electrical interface to a power source and a set of one or more couplers that selectively, detachably, physically couples the power source to the wrist mount, and a flexible substrate, the flexible substrate carrying one or more electrically conductive paths that extend between the wrist mount and at least one of the finger mount and the scan engine at least to provide power from the power source to the scan engine, may be summarized as including receiving a first set of one or more signals at a controller, the controller physically coupled to the wrist mount; upon receiving the first set of one or more signals, transmitting one or more signals to the scan engine, the one or more signals causing the scan engine to perform a scan of within a field of view of the scan engine; receiving at the controller a second set of one or more signals from an accelerometer or other force sensing mechanism; determining that the second set of one or more signals are above a defined amount, the defined amount associated with a force above a defined amount being applied to the power source; and upon receiving the second set of one or more signals, transmitting one or more signals that cause the set of one or more couplers to decouple the power source from the wrist mount. The one or more signals may be received at the controller from at least one of a presence sensor or a user input device.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

DETAILED DESCRIPTION

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures associated with scan engines, imagers, decoding circuitry, and/or machine-readable symbol readers have not been shown or described in detail to avoid unnecessarily obscuring descriptions of the implementations.

Unless the context requires otherwise, throughout the specification and claims that follow, the word "comprising" is synonymous with "including," and is inclusive or open-ended (i.e., does not exclude additional, unrecited elements or method acts).

Reference throughout this specification to "one implementation" or "an implementation" means that a particular feature, structure or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

As used in this specification and the appended claims, the singular forms "a," "an," and "the" include plural referents unless the context clearly dictates otherwise. It should also be noted that the term "or" is generally employed in its sense including "and/or" unless the context clearly dictates otherwise.

The headings and Abstract of the Disclosure provided herein are for convenience only and do not interpret the scope or meaning of the implementations.

Figure 1:
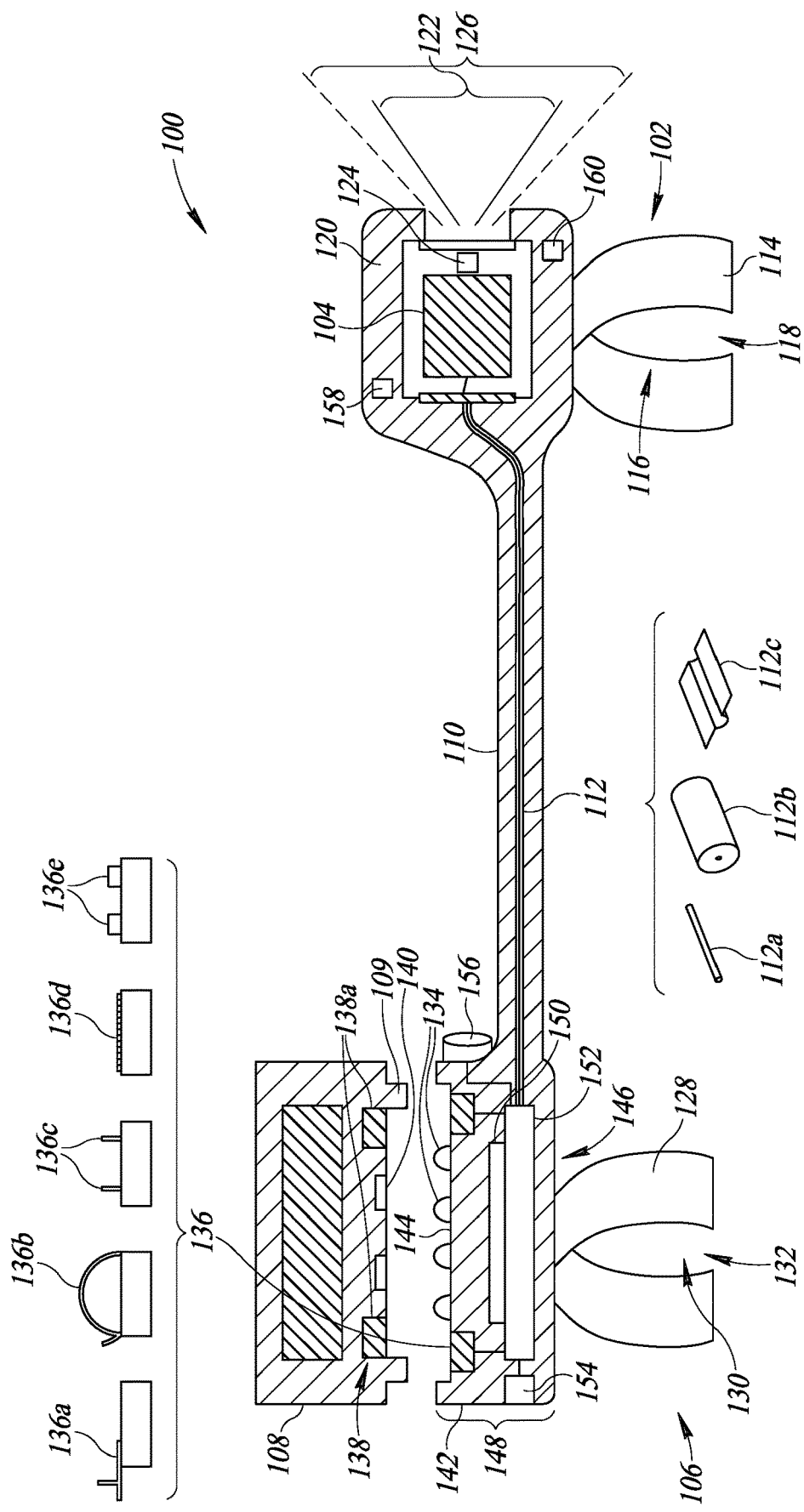
FIG. 1 is a cross-sectional view of a machine-readable symbol reader that includes a finger mount with a scan engine, and a wrist mount with a power source, according to at least one illustrated implementation.

FIG. 1 shows a machine-readable symbol reader 100 that includes a finger mount 102 with a scan engine 104, and a wrist mount 106 with a power source 108, according to at least one illustrated implementation. In some implementations, a flexible substrate 110 may extend between the wrist mount 106 and at least one of the finger mount 102 and the scan engine 104. One or more electrically conductive paths 112 may be carried by the flexible substrate 110. In some implementations, the machine-readable symbol reader 100 may include a controller 152.

The finger mount 102 may include a ring 114 that may be sized and dimensioned to accommodate one or more fingers of a user. In some implementations, the ring 114 may be annular in shape with an interior opening 116 that may be sized and dimensioned to receive a single finger of the user. Such a ring 114 may be comprised of a rigid material, such as a plastic or metal. In some implementations, the ring 114 may be closed, without any gaps. In some implementations, the ring 114 may have a gap 118 that enables the ring 114 to flex radially outward and thereby receive fingers of different sizes. In some implementations, the gap 118 may have a constant spacing, while in other implementations the gap 118 may stretch or vary in size during use. In some implementations, the finger mount 102 may include a strap that forms an opening that may be sized and dimensioned to receive one or more fingers from the user. In such an implementation, the strap may be comprised of elastic material that may stretch to accommodate and receive the one or more fingers. In some implementations, the strap may be comprised of an inelastic fabric, such as a woven nylon material. As such, the strap may be manually adjustable using, for example, a D-ring or other similar component.

The finger mount 102 may be physically coupled to the scan engine 104 such that the scan engine 104 moves with the finger mount 102. In some implementations, the scan engine 104 may be physically coupled to the finger mount 102 using an adhesive and/or other couplers such as bolts such that the scan engine 104 is not easily removable from the finger mount 102 by the user. In some implementations, the finger mount 102 may include a selectively detachable coupler, such as a releasable latch or strap, to physically couple the scan engine 104 to the finger mount 102. In some implementations, the selectively detachable coupler may include one or more apertures on the scan engine 104 (or the finger mount 102), and corresponding posts on the finger mount 102 (or the scan engine 104) in which the posts are securely inserted into the corresponding apertures to releasably, physically couple the scan engine 104 to the finger mount 102. In some implementations, the finger mount 102 may include a platform 120 that may provide a surface on which the scan engine 104 may be mounted and securely, physically coupled. In such implementations, the finger mount 102 may be used to secure the scan engine 104 to one or more fingers of the user. In some implementations, the scan engine 104 may be relatively small in size (e.g., 8×22×15 millimeters or less).

The scan engine 104 may be used to capture electronic representations of one or more images in which each image is comprised of a portion of the surrounding environment within a field of view 122 of the scan engine 104. In some implementations, the field of view 122 may be oriented to extend outward from the scan engine 104 in a direction of an extended finger when the finger mount 102 is mounted on the finger. Such electronic representations may be made, for example, by a set of transducers that convert light waves into electrical signals. In some implementations, the scan engine 104 may be a flood illumination or ambient lighting, scanning-type (e.g., flying spot) machine-readable symbol readers or scan engines. Such scanning-type (e.g., flying laser spot) machine-readable symbol readers or scan engines could typically scan a laser beam across the machine-readable symbol, and detect a reflected or response profile via a photodiode. Such machine-readable symbols may be one-dimensional (e.g., barcode symbols) or two-dimensional machine-readable symbols (e.g., area or matrix code symbols). Machine-readable symbols are based on machine-readable symbologies (e.g., Code 39, Code 128, EAN13, Code 93, DataMatrix, PDF 417, QR Code) which define respective mappings between areas of high and low reflectance and human understandable characters (e.g., alphanumeric, extended ASCII).

In some implementations, the scan engine 104 may include a presence sensor 124 that may generate a signal to trigger the scan by the scan engine 104. Such a presence sensor 124 may have a field of view 126 that may encompass or at least partially overlap the field of view 122 of the scan engine 104. The presence sensor 124 may generate the signal when an object is detected within the field of view 126 of the presence sensor 124. Such a presence sensor 124 may include, for example, an emitter-collector pair that transmits a light, ultra-sonic, electromagnetic or other suitable signal towards the field of view 126 of the presence sensor 124 using an emitter and detects any amount of the transmitted signal that has reflected or returned from an object that is received at a collector. The signal may have a temporal or frequency or wavelength pattern imposed thereon, for example to facilitate detection of the returned signal from ambient signals. In some implementations, the presence sensor 124 may include one or more of a capacitive, photoelectric, inductive, or Hall Effect sensor that may be used to detect the presence of an object within the field of view 126. In some implementations, for example, the presence sensor 124 may detect the presence of an object based upon the amount of light that has been reflected from the object. The presence sensor 124 may generate the signal upon detecting the presence of an object within the field of view 126. In some implementations, as discussed below, scanning by the scan engine 104 may be triggered based upon a signal generated at a user input device.

The wrist mount 106 may include a cuff 128 that may be sized and dimensioned to accommodate a portion of an arm of a user. In some implementations, the cuff 128 may be annular in shape with an interior opening 130 that may be sized and dimensioned to receive the wrist and/or forearm of the user. Such a cuff 128 may be comprised of a rigid material, such as a plastic or metal. In some implementations, the cuff 128 may have a gap 132 that enables the cuff 128 to flex radially outward and thereby receive wrists and/or forearms of different sizes. In some implementations, the wrist mount 106 may include a strap that forms an opening that may be sized and dimensioned to receive the wrist and/or forearm of the user. In such an implementation, the strap may be comprised of silicone, rubber, and/or any other elastic material that may stretch to accommodate and receive the wrist and/or forearm. In some implementations, the strap may be comprised of an inelastic fabric, such as a woven nylon material. As such, the strap for the wrist mount 106 may be manually adjustable using, for example, a D-ring or other similar component.

In some implementations, the wrist mount 106 may include one or more electrical interfaces 134. Such electrical interfaces 134 may include, for example, one or more electrical receptacles that may be used to electrically couple with corresponding electrical plugs. In some implementations, for example, such an electrical receptacle and plug may be comprised of a bayonet style electrical connector. In some implementations, the electrical interfaces 134 may include one or more electrically conductive pads that may be used to electrically couple with corresponding electrically conductive pads, such as may be included, for example, on an external power source (e.g., a battery). In some implementations, such electrically conductive pads may be inductively coupled such that an external power source may be used to supply power to the components on the machine-readable symbol reader 100.

The wrist mount 106 may include one or more couplers 136 that may be used to physically couple items to the wrist mount 106. Such couplers 136 may include, for example, one or more of latches 136a, straps 136b, posts 136c and/or apertures, Velcro 136d, electromagnets 136e or other piece of ferrous metal, or any other type of structure that may be used to secure an object to the wrist mount 106. In some implementations, the couplers 136 may enable the object to be selectively detached from the wrist mount 106. Such an implementation may be advantageous, for example, by enabling the quick and easy attachment and detachment of objects, such as the power source 108, to the wrist mount 106. In some implementations, the object to be coupled to the wrist mount 106 may have a corresponding and complementary coupling structure that may engage with the couplers 136 to thereby physically couple the object to the wrist mount 106. In some implementations, as discussed below, the couplers 136 may be selectively activated and deactivated to couple and de-couple objects, such as the power source 108, to the wrist mount 106. In such implementations, for example, one or more sensors on the wrist mount 106 may be used to indicate that the wrist mount 106 has impacted another object within the environment surrounding the user. In such an implementation, the couplers 136 may be selectively deactivated to de-couple the object, such as the power source 108, from the wrist mount 106 when an impact is detected. In some implementations, the couplers 136 may be selectively deactivated to de-couple the object, such as the power source 108, from the wrist mount 106 when the signals received from the sensor indicate that an impact has resulted in a force above a defined amount (e.g., a threshold amount) has been applied to the object physically coupled to the wrist mount 106.

The power source 108 may be any type of external, portable power supply such as, for example, a rechargeable battery (e.g., a lithium ion battery). In some implementations, the power source 108 may be sized and shaped to attach to the wrist mount 106 and thereby be transported along an arm of a person. As such, the power source 108 may be small and compact so as to minimize the impact that the power source 108 may have on movement of the arm. The power source 108 may include one or more types of couplers 138 that may engage with and physically couple corresponding couplers 136 on the wrist mount 106. Such couplers 138 may include, for example, one or more of latches, straps, posts and/or apertures, Velcro, magnets 138a, or any other type of structure that may be used to secure an object to the wrist mount 106. In some implementations, the power source 108 may be releasable from the wrist mount 106 when a sufficient force is applied to the power source 108. Such an implementation may advantageously be used to release the power source 108 from the wrist mount 106 when the power source 108 comes into contact with and/or impacts an object in the environment surrounding the user. In some implementations, as discussed below, one or both of the couplers 138 on the power source 108 and the couplers 136 on the wrist mount 106 may receive one or more signals that result in the power source 108 decoupling from the wrist mount 106. Such decoupling may occur, for example, in situations in which one or both set of couplers 136, 138 are comprised of electromagnets that may be selectively activated and deactivated by applying or removing, respectively, an electric potential to the electromagnets.

The power source 108 may include one or more electrical interfaces 140 that may align and electrically couple with corresponding electrical interfaces 134 on the wrist mount 106 when the power source 108 is physically coupled to the wrist mount 106. Such electrical interfaces 140 on the power source 108 may include, for example, one or more of an electrical receptacle and/or an electrical plug that complements the corresponding electrical interface 134 on the wrist mount 106. In some implementations, the electrical interface 140 may include an electrical pad that may be used to inductively, electrically couple with a corresponding electrical pad on the wrist mount 106 to thereby transmit current. In some implementations one or more of the power source 108 and/or the wrist mount 106 may include a gasket 109 or other flexible, compressible material that may be positioned between the power source 108 and the wrist mount 106 to protect against intrusion by foreign materials, such as dust and/or water.

In some implementations, the power source 108 may include one of multiple batteries, each of which may be physically and electrically coupled to the wrist mount 106 at a time. In some implementations, each of the multiple batteries may include couplers 138 that align and engage with corresponding couplers 136 on the wrist mount 106 such as to be securely, physically coupled to the wrist mount 106. In some implementations, at least some of the multiple types of batteries may be of different sizes and/or may hold a different amount of charge when fully charged. As such, the user may choose amongst the multiple different batteries for the battery size and battery charge that best matches with the task that the user may be performing. In some implementations, for example, the user may need to use the machine-readable symbol reader 100 for an extended period of time (e.g., all day). As such, the user may couple to the wrist mount 106 a battery that holds a large amount of charge. In other situations, the user may need to use the machine-readable symbol reader 100 for a short time period to perform a discrete task. As such, the user may physically couple a smaller, lighter battery to the wrist mount 106.

In some implementations, the wrist mount 106 may include one or more platforms 142 that may be used to mount objects onto the wrist mount 106. For example, in some implementations, the platform 142 may have a first major surface 144 and a second major surface 146 separated by a width 148. As such, the platform 142 may be located along the wrist mount 106 such that the first major surface 144 faces towards the arm or wrist of a user when the wrist mount 106 is mounted on the user. In such a situation, the second major surface 146 may face outwards away from the wrist or arm, and thereby be accessible to the user when wearing the wrist mount 106. In such an implementation, the second major surface 146 may include the one or more couplers 136 that may be used to physically couple the power source 108 to the wrist mount 106, and/or the one or more electrical interfaces 134 that may be used to electrically couple the power source 108 to the wrist mount 106. The couplers 136 on the platform 142 may be used to align the electrical interface(s) 134 on the wrist mount 106 to the corresponding electrical interface(s) 140 on the power source 108 when the power source 108 is physically coupled to the wrist mount 106.

The flexible substrate 110 may extend between and physically couple the finger mount 102 and the wrist mount 106. In some implementations, the flexible substrate may be comprised of a flexible, elastic, non-conductive material that may have sufficient elasticity to stretch and/or bend as the finger mount 102 moves relative to the wrist mount 106 without becoming deformed. In such an implementation, the flexible substrate 110 may be comprised of a silicone sheathing wire that may be flexible and robust. As such, the flexible substrate 110 may remain proximate the skin of the arm and/or hand of the user as the machine-readable symbol reader 100 is used and manipulated to scan machine-readable symbols, thereby reducing the possibility that the flexible substrate 110 may become caught or tangled with objects in the environment surrounding the user. Such a feature may increase the safety and effectiveness of the machine-readable symbol reader 100. In some implementations, the flexible substrate 110 may carry one or more conductive paths 112 that extend between the wrist mount 106 and one or both of the finger mount 102 and the scanning engine 104. Such conductive paths 112 may be used to carry power from the power source 108 to the scan engine 104. Such conductive paths 112 may be used to carry one or more signals between the scan engine 104 and the wrist mount 106. Such signals may include, for example, signals transmitted from a component at the wrist mount 106 to trigger the scan engine 104 to perform a scan of the field of view 122 and/or signals transmitted from the scan engine 104 to components at the wrist mount 106 related to a scan. In some implementations, the flexible substrate 110 may include a flexible printed circuit board and/or a flexible textile. In some implementations, the electrically conductive paths 112 may include one or more electrically conductive wires 112a, insulated electrically conductive wires 112b, and/or electrically conductive traces 112c. In some implementations, the electrically conductive paths 112 may be embedded within the flexible substrate 110 such as to provide an additional layer of protection for the electrically conductive paths 112.

In some implementations, the machine-readable symbol reader 100 may include a decoding subsystem 150 that may be communicatively coupled to receive signals from the scan engine 104 in which the received signals relate to a scanned machine-readable symbol. In such an implementation, the decoding subsystem 150 may decode the information that may be encoded within the machine-readable symbol. The machine-readable symbols typically take the form of either one-dimensional machine-readable symbols (e.g., barcode symbols) or two-dimensional machine-readable symbols (e.g., area or matrix code symbols). Machine-readable symbols are based on machine-readable symbologies (e.g., Code 39, Code 128, EAN13, Code 93, DataMatrix, PDF 417, QR Code) which define respective mappings between areas of high and low reflectance and human understandable characters (e.g., alphanumeric, extended ASCII). The decoding subsystem may decode the machine-readable symbols based upon the machine-readable symbologies. In some implementations, the decoding subsystem 150 may be included within the wrist mount 106. As such, the electrically conductive paths 112 may include one or more paths that may be used to transmit the signals from the scan engine 104 to the decoding subsystem 150. In some implementations, the decoding subsystem 150 may be included within the finger mount 102. As such, the electrically conductive paths 112 may be used to only supply power to the scan engine 104 and any other components on the finger mount 102 thereby reducing the number of physical wires that extend between the wrist mount 106 and the finger mount 102 and/or scan engine 104.

The controller 152 may take the form of any current or future developed processor-enabled device capable of executing one or more instruction sets. The controller 152 may include one or more processing units to execute one or more processor-readable instructions, instruction sets, or instruction blocks. The controller 152 may include a system memory to store one or more processor-readable instructions, instruction sets, or instruction blocks to be executed by the processor. In some implementations, the system memory may be embedded with the processing unit. Such processor-readable instructions, instruction sets, or instruction blocks may be executed by the controller 152 to transmit signals to trigger the scan engine 104 to scan within the field of view 122, such as, for example, when the controller 152 receives a signal from the presence sensor 124 indicating the presence of an object. Such processor-readable instructions, instruction sets, or instruction blocks may be executed by the controller 152 to transmit signals to selectively decouple the power source 108 from the wrist mount 106, such as, for example, by transmitting signals to deactivate the electromagnets 136e on the wrist mount 106.

In some implementation, the controller 152 may be communicatively coupled with other devices, such as the handheld processor-based terminal via a wireless transmission subsystem 154 using one or more wireless communications protocols, such as, for example, Wi-Fi, Ethernet, Bluetooth, ZigBee or any other acceptable communication protocol. In some implementations, the wireless transmission subsystem 154 may be incorporated into the controller 152 or may be separate from the controller 152. The wireless transmission subsystem 154 may transmit one or more signals to a remote processor (not shown) in which the one or more signals relate, for example, to various information related to or collected by the machine-readable symbol reader 100. In some implementations, for example, the one or more signals transmitted by the wireless transmission subsystem 154 may be related to the decoded information obtained by the decoding subsystem 150 from an image of a machine-readable symbol scanned by the scan engine 104. In some implementations, one or both of the controller 152 and/or the wireless transmission subsystem 154 may be located at the wrist mount 106 and/or at the finger mount 102.

In some implementations, the machine-readable symbol reader 100 may include an accelerometer 156 that is communicatively coupled to the controller 152. The accelerometer 156 may be physically coupled to and may move with the wrist mount 106. The accelerometer 156 may generate one or more signals based upon the acceleration of the accelerometer 156 (and thus the wrist mount 106) through three-dimensional space. Accordingly, when the wrist mount 106 impacts an object in the environment surrounding the user, the accelerometer 156 will detect a sudden deceleration and/or force applied to the wrist mount 106 associated with the direction in which the wrist mount 106 impacted the object. Such a sudden deceleration and/or force may thereby result in a signal that differs from the signals generated by the accelerometer 156 when the accelerometer 156 moves freely through space. As such, the controller 152 may include one or more processor-readable instructions, instruction sets, or instruction blocks that may be used to detect such a sudden deceleration and/or force from the signals received from the accelerometer 156. For example, in some implementations, the processor-readable instructions, instruction sets, or instruction blocks executed by the controller may include a defined and/or threshold value for such deceleration and/or force indicated by the signals received from the accelerometer 156. When the signal from the accelerometer 156 indicates that the deceleration experienced by the accelerometer 156 exceeds this defined and/or threshold value, the controller 152 may generate one or more signals to selectively decouple the power source 108 from the wrist mount 106 as discussed above (e.g., by deactivating one or more electromagnets 136e on the wrist mount 106). Such a process may be used to protect the machine-readable symbol reader 100 and/or the objects in the surrounding environment by causing the power source 108 to be detached and released from the wrist mount 106 before the impact results in unnecessary and significant damage.

As an alternative solution to an accelerometer, a magnetic field sensor, such as a Hall sensor, can be used to detect the application of a force above a certain threshold to the magnets, such force determining a sudden change in the magnetic field. In the simplest embodiment, the size, shape, distance and material of the magnets can be selected so as to determine their separation only when a force above a certain threshold is applied.

In some implementations, the machine-readable symbol reader 100 may be communicatively and/or electrically coupled to one or more of a vibration source 158 and/or one or more LEDs 160. The vibration source 158 may include, for example, a motor or some other component that vibrates when activated. The one or more LEDs 160 may emit light of different intensities and/or colors. The vibration source 158 and/or the one or more LEDs 160 may be used to provide feedback and/or other information for the user. For example, when a scan is performed, the vibration source 158 may vibrate and/or one or more of the LEDs may emit light of a defined intensity and/or color.

Figure 2:
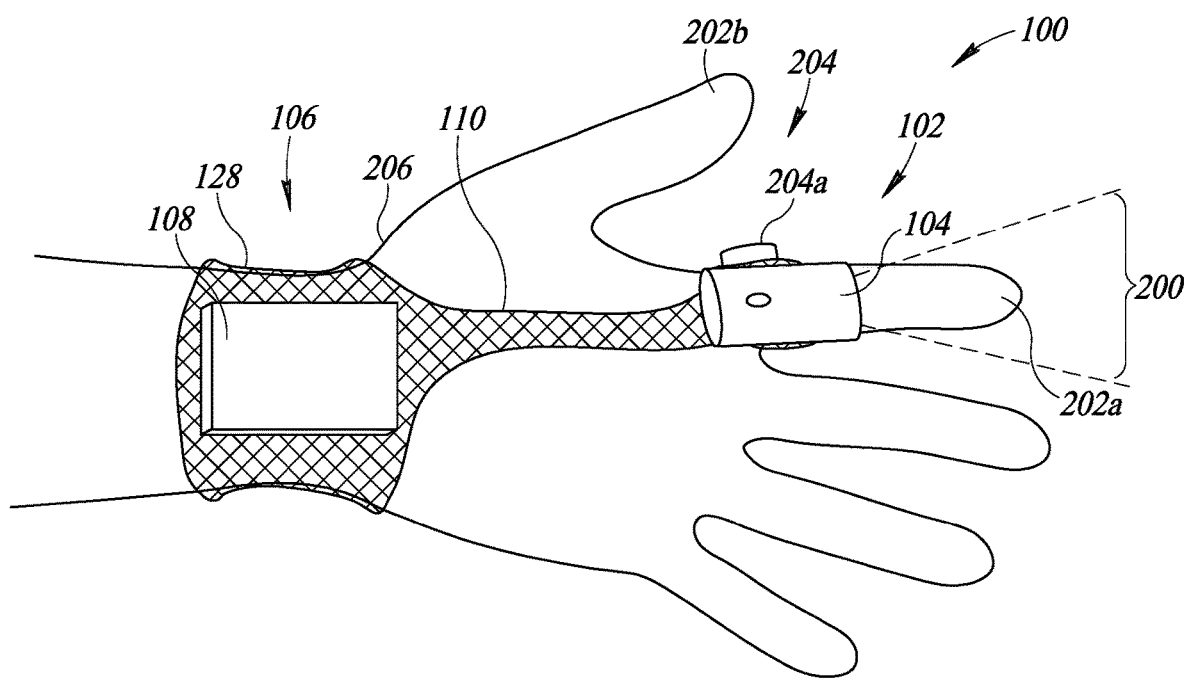
FIG. 2 is a top isometric view of a type of machine-readable symbol reader in which the finger mount and the wrist mount are physically coupled via a flexible substrate, according to at least one illustrated implementation.

FIG. 2 shows the machine-readable symbol reader 100 in which the finger mount 102 and the wrist mount 106 are physically coupled via the flexible substrate 110, according to at least one illustrated implementation. The finger mount 102 may be mounted on a finger 202a at a location proximate the knuckle of the user. The scan engine 104 that is carried by the finger mount 102 may be located along a top surface of the finger 202a, opposite the surface of the finger 202a that folds into the palm of the hand. As such, the scan engine 104 may move with the finger mount 102 as the finger mount 102 is moved by the finger 202a of the user. The scan engine 104 may have a field of view 200 that extends outward towards the tip of the finger 202a on which the finger mount 102 is mounted. In some implementations, such as that shown in FIG. 2, the finger mount 102 may include a ring, strap, or other similar structure with an aperture that may be sized and shaped to receive a single finger (e.g., finger 202a) of the user. In some implementations, the finger mount 102 may include a ring, strap, or other similar structure with an aperture that may be sized and shaped to receive multiple fingers of the user. In some implementations, the ring, strap, or other structure may have some elasticity or flexibility to accommodate and securely receive fingers of different sizes. In some implementations, the ring, strap, or other structure may be adjustable.

In some implementations, the finger mount 102 may include a user input device 204, such as a user actuatable button 204a. In such an implementation, the user input device 204 may be used to produce one or more signals when activated, such as may occur, for example, when the user depresses or holds the user input device 204, such as the user actuatable button 204a. In some implementations, the user input device 204 may be comprised of one or more user actuatable buttons 204a or switches that may extend outward form one or more surfaces of the finger mount 102. For example, in some implementations, the user actuatable button 204a may extend outward from a surface of the finger mount 102 that faces towards a finger 202b that is adjacent to the finger 202a on which the finger mount 102 is mounted. In some implementations, the adjacent finger 202b may be the thumb of the user, which may facilitate the user depressing or otherwise activating the user actuatable button 204a. In such implementations, the user may be able to locate and depress the user input device 204 through feel, without the need to visually identify and/or locate the user input device 204.

The user input device 204 may generate one or more signals when activated (e.g., depressed). Such signals may be received by the controller 152 and used to trigger one or more functions, applications, and/or operations to be executed by the scan engine 104. For example, in some implementations, the user input device 204 may generate a signal when activated that is transmitted to the controller 152. The controller 152, upon receiving such a signal, may transmit a signal to the scan engine 104 that results in the scan engine 104 performing a scan within the field of view 122 of the scan engine 104, thereby capturing a representation of a machine-readable symbol that is within the field of view 122 during the scan.

The flexible substrate 110 may extend away from the finger mount 102 in a direction towards the arm of the user. In some implementations, the flexible substrate 110 extends along the top of the hand of the user. The flexible substrate 110 may be comprised of elastic, flexible material that flexes and bends with the movement of the finger mount 102 relative to the wrist mount 106. In some implementations, for example, the flexible substrate 110 may be comprised of shaped or formed rubber, plastic, or other flexible elastomers. In such implementations, the flexible substrate 110 may remain taut when the machine-readable symbol reader 100 is worn by the user. As such, little to no slack, bends, and/or turns may be present in the flexible substrate 110 when the flexible substrate 110 extends between the finger mount 102 mounted on the finger 202a and the wrist mount 106 mounted on the wrist. One or more electrically conductive paths 112 may extend through the flexible substrate 110.

The wrist mount 106 may be mounted on a wrist 206 at a location proximate the hand of the user. In such an implementation, the power source 108 may be physically coupled to the wrist mount 106 such that the power source 108 is located along a top surface of the wrist 206. The wrist mount 106 may include a cuff 128 that may be sized and dimensioned to accommodate the wrist 206 of the user. In some implementations, the cuff 128 may be annular in shape with an interior opening 130 that may be sized and dimensioned to receive the wrist 206 of the user. Such a cuff 128 may be comprised of a rigid material, such as a plastic or metal. In some implementations, the cuff 128 may be able to flex to thereby receive wrists and/or forearms of different sizes. In some implementations, the wrist mount 106 may include a strap that forms an opening that may be sized and dimensioned to receive the wrist 206 of the user. In such an implementation, the strap may be comprised of elastic material that may stretch to accommodate and receive the wrist 206. In some implementations, the cuff 128 may be adjustable to accommodate the size of the wrist 206 of the user.

Figure 3A:
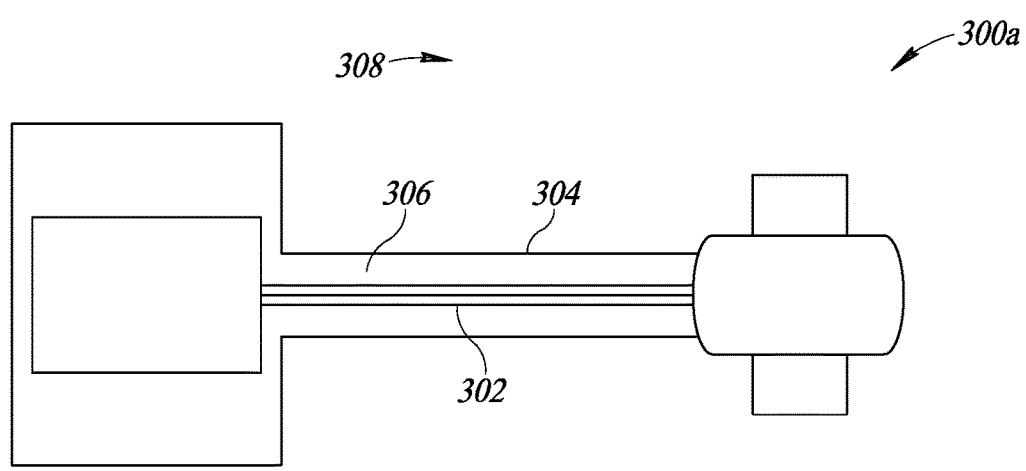
FIG. 3A is a schematic diagram of a type of flexible substrate in which each of the one or more electrically conductive paths extends along a straight path between the finger mount and the wrist mount, according to at least one illustrated implementation.
Figure 3B:
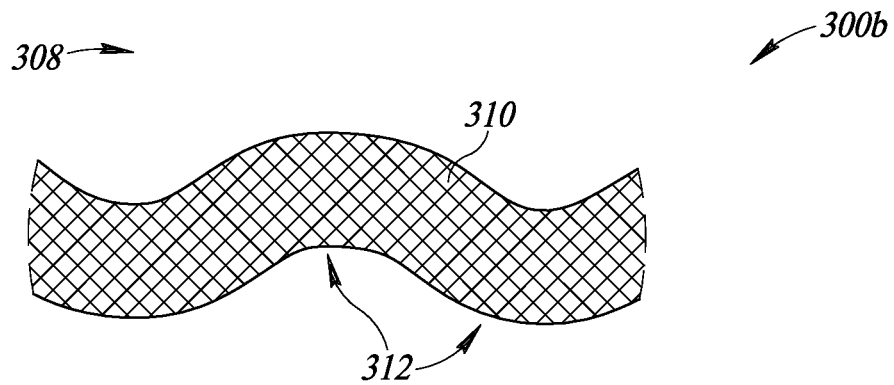
FIG. 3B is a schematic diagram of a type of flexible substrate that carries one or more electrically conductive paths, in which the flexible substrate extends along a path with at least one turn between the finger mount and the wrist mount, according to at least one illustrated implementation.
Figure 3C:
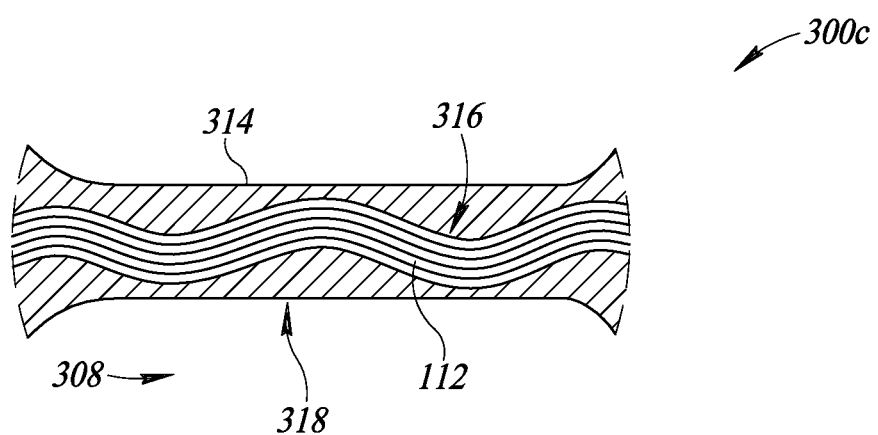
FIG. 3C is a schematic diagram of a type of flexible substrate that carries one or more electrically conductive paths that are embedded within the flexible substrate, in which the flexible substrate extends between the finger mount and the wrist mount in a substantially straight path and in which each of the electrically conductive paths extends along a path with at least one turn between the finger mount and the wrist mount, according to at least one illustrated implementation.

FIGS. 3A, 3B, and 3C show different types of flexible substrates (collectively, flexible substrates 300) in which one or more electrically conductive paths 302 extend between the finger mount 102 and the wrist mount 106. A first flexible substrate 300a (FIG. 3A) may be comprised of a single piece of formed and/or molded material. Such material may include, for example, flexible, durable materials such as various types of plastics, rubber, or other similar types of material. The first flexible substrate 300a may include a smooth, outer surface 304 that may delineate an interior portion 306 of the first flexible substrate 300a from an exterior portion 308. The outer surface 304 may extend from the finger mount 102 to the wrist mount 106 with few or no turns when the machine-readable symbol reader 100 is mounted on the user. The first flexible substrate 300a may bend and/or flex to accommodate the movement of the finger mount 102 relative to the wrist mount 106.

In some implementations, the first flexible substrate 300a may include a flexible printed circuit board and/or a flexible textile within the interior portion 306. In some implementations, the interior portion 306 of the first flexible substrate 300a may surround one or more electrically conductive paths 112. Such the electrically conductive paths 112 may include one or more of electrically conductive wires, insulated electrically conductive wires, and/or electrically conductive traces. In some implementations, the electrically conductive paths 112 may be comprised of an electrically conductive material that may return to an original, non-stressed state after being elongated and/or compressed. Such materials may include, for example harmonic steel materials and/or electrically conductive fabrics. The electrically conductive paths 112 may extend between the finger mount 102 and the wrist mount 106 with few or no bends or turns. The electrically conductive paths 112 may flex and/or bend to accommodate the movement of the finger mount 102 relative to the wrist mount 106.

A second flexible substrate 300b (FIG. 3B) may be comprised of multiple pieces or strands of a woven or braided material, such as nylon, plastics, silicone, or any other type of flexible, durable, and non-conductive material. In some implementations, for example, the second flexible substrate 300b may be comprised of a silicone sheathing wire that may be flexible and robust. The second flexible substrate 300b may include a woven outer surface 310 that may delineate an interior portion (not shown) of the second flexible substrate 300a from the exterior portion 308. The second flexible substrate 300b may have a winding shape, and may include one or more bends or turns 312 between the finger mount 102 and the wrist mount 106. As such, the length of the second flexible substrate 300b may be longer than a distance between the finger mount 102 and the wrist mount 106 when the machine-readable symbol reader 100 is mounted on the user. Such bends or turns 312 may accommodate the movement of the finger mount 102 relative to the wrist mount 106. The interior portion of the second flexible substrate 300b may surround one or more electrically conductive paths 112. Such the electrically conductive paths 112 may include one or more of electrically conductive wires, insulated electrically conductive wires, and/or electrically conductive traces. In some implementations, the electrically conductive paths 112 may be comprised of an electrically conductive material that may return to an original, non-stressed state after being elongated and/or compressed. Such materials may include, for example harmonic steel materials and/or electrically conductive fabrics. The electrically conductive paths 112 may extend between the finger mount 102 and the wrist mount 106. The electrically conductive paths 112 may have a winding shape, with one or more bends or turns between the finger mount 102 and the wrist mount 106. Such bends and turns may follow the bends or turns 312 of the second flexible substrate 300b.

A third flexible substrate 300c (FIG. 3C) may be, in some implementation, comprised of a single piece of formed and/or molded material. Such material may include, for example, flexible durable materials such as various types of plastics, rubber, or other similar types of material. In some implementations, the third flexible substrate 300c may be comprised of multiple pieces or strands of a woven or braided material, such as nylon, plastics, silicone, or any other type of flexible, durable, and non-conductive material. In some implementations, for example, the third flexible substrate 300c may be comprised of a silicone sheathing wire that may be flexible and robust. The third flexible substrate 300c may include an outer surface 314 that may delineate an interior portion 316 of the third flexible substrate 300c from the exterior portion 308. The outer surface 314 may extend from the finger mount 102 to the wrist mount 106 with few or no turns when the machine-readable symbol reader 100 is mounted on the user. In some implementations, the third flexible substrate 300c may include a flexible printed circuit board and/or a flexible textile within the interior portion 316. In some implementations, the interior portion 316 of the third flexible substrate 300c may surround one or more electrically conductive paths 112. Such the electrically conductive paths 112 may include one or more of electrically conductive wires, insulated electrically conductive wires, and/or electrically conductive traces. The electrically conductive paths 112 may extend between the finger mount 102 and the wrist mount 106 with a winding shape, with one or more bends or turns 318 when the third flexible substrate 300c is in a non-stressed state. Such one or more bends or turns 318 may accommodate movement of the finger mount 102 relative to the wrist mount 106. For example, the one or more bends or turns 318 of the electrically conductive paths 112 may become relatively straighter when the flexible substrate 300c is flexed, and become relatively more curved when the flexible substrate 300c returns to a non-stressed state.

Figure 4:
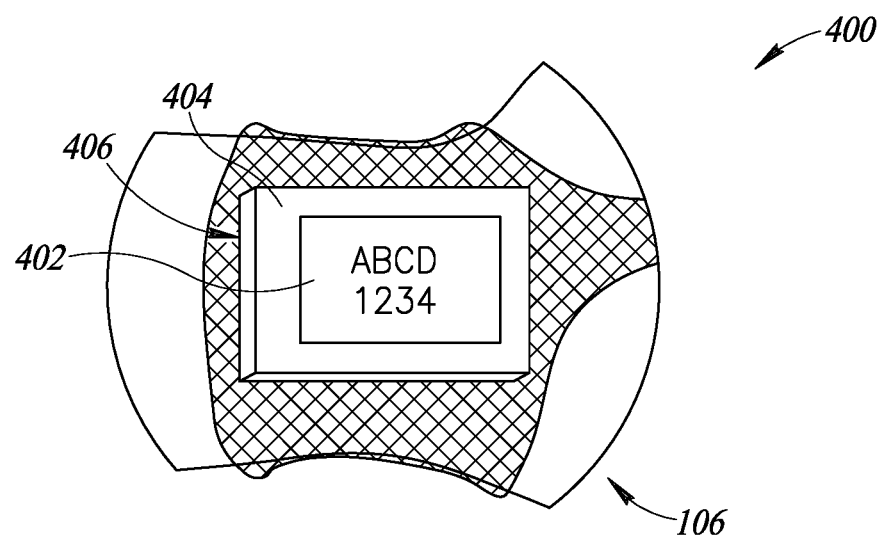
FIG. 4 is a top plan view of a power source that includes a display, according to at least one illustrated implementation.

FIG. 4 shows a power source 400 that includes a display 402 for presenting information, according to at least one illustrated implementation. The power source 400 may have a first surface 404 and a second surface 406 separated by a width of the power source 400. The power source 400 may include one or more couplers 138 along the second surface 406. Such couplers 138 may be used to physically couple the power source 400 to a wrist mount 106. The display 402 may be carried along the first surface 404 of the power source 400. As such, the display 402 may face outward, away from the wrist mount 106, when the power source 400 is physically coupled to the wrist mount 106. The display 402 may be comprised of an electronic screen that may be used to render images upon the display 402. Such images may be comprised of any one or more of text, pictures, diagrams, graphs, or any other type of visual representation of data and/or information. Such information may include, for example, the amount of power remaining in the power source 400. The display 402 may be comprised of any type of electronically controllable display in which one or more signals (e.g., such as signals received from the controller 152) may be used to control and modify the images being rendered upon the display 402. In some implementations, for example, the display 402 may be comprised of a type of liquid crystal display ("LCD"), a type of light emitting diode ("LED") display such as an organic LED ("OLED") display or a MicroLED display, or any other type of electronically controllable screen, such as a dot matrix display screen. In some implementations, for example, the display 402 may be comprised of an electronic ink ("e-ink") display that may be used to provide images to the display 402 based upon one or more signals, such as those that might be received from the controller 152. In some implementations, an LED display may be used with another type of display (e.g., a dot matrix display) such that the LED display may be used to highlight portions of the display 402, such as may occur, for example, to highlight an alarm being presented on the display 402.

Figure 5:
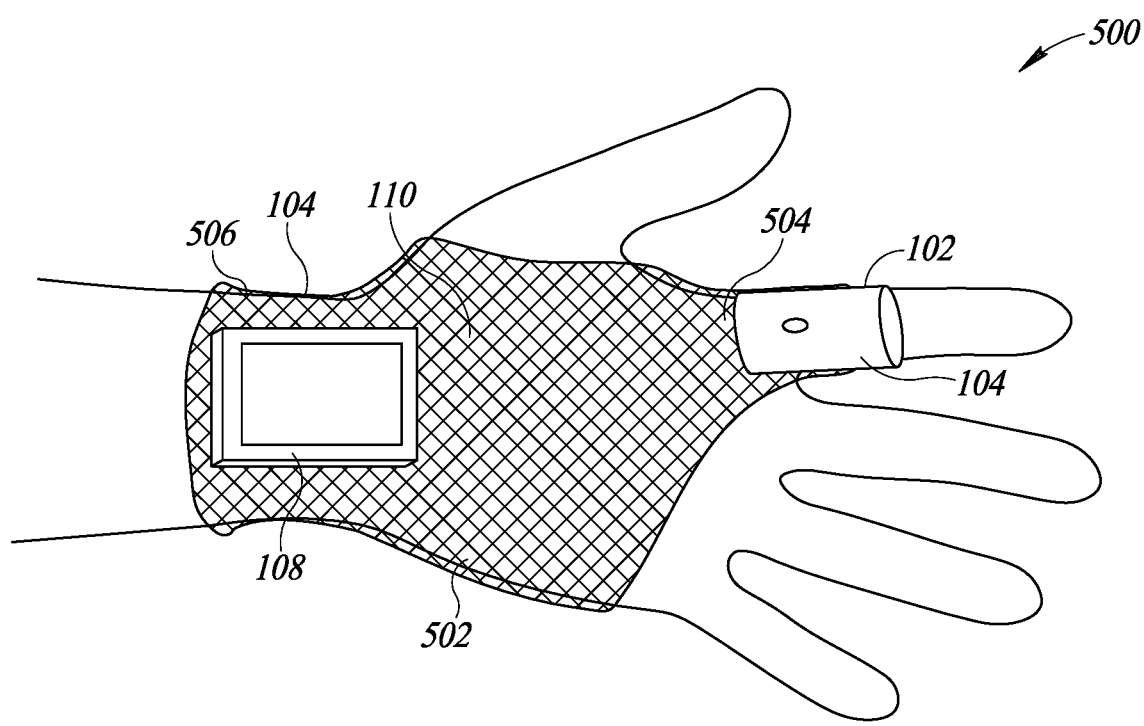
FIG. 5 is a top isometric view of a machine-readable symbol reader that includes a glove that may physically couple to the finger mount and the wrist mount, according to at least one illustrated implementation.

FIG. 5 shows a type of machine-readable symbol reader 500 in which the flexible substrate is comprised of a glove 502 that may physically couple to the finger mount 102 and the wrist mount 106, according to at least one illustrated implementation. In such an implementation, the finger mount 102 may be included as a portion of a finger 504 in the glove 502 and may be used to carry a scan engine 104. The finger 504 may be sized and shaped to surround at least a portion of a finger of the user. The wrist mount 102 may include a cuff 506 that surrounds at least a portion of the wrist of the user and may be used to physically couple a power source 108. The glove may be comprised of any type of material that may be used to securely attach the finger mount 102 and/or the wrist mount 106 to the hand and/or wrist of the user. Such material may include rubber, leather, cloth, latex, nitrile, neoprene, vinyl, and/or any other similar type of material. In some implementations, the glove 502 may include a flexible printed circuit board and/or a flexible textile that is coupled to one or more of the wrist mount 106, the power source 108, the finger mount 104, and the scan engine 104. In some implementations, the glove 502 may include one or more of electrically conductive wires, insulated electrically conductive wires, and/or electrically conductive traces. Such one or more of the electrically conductive wires, the insulated electrically conductive wires, and/or the electrically conductive traces may be embedded in the glove 502, and may extend between one or more of the wrist mount 106, the power source 108, the finger mount 104, and the scan engine 104. In one or more implementations, the glove 502 may be a full glove and/or may be fingerless in which one or more of the fingers on the glove 502 may be removed.

Figure 6:
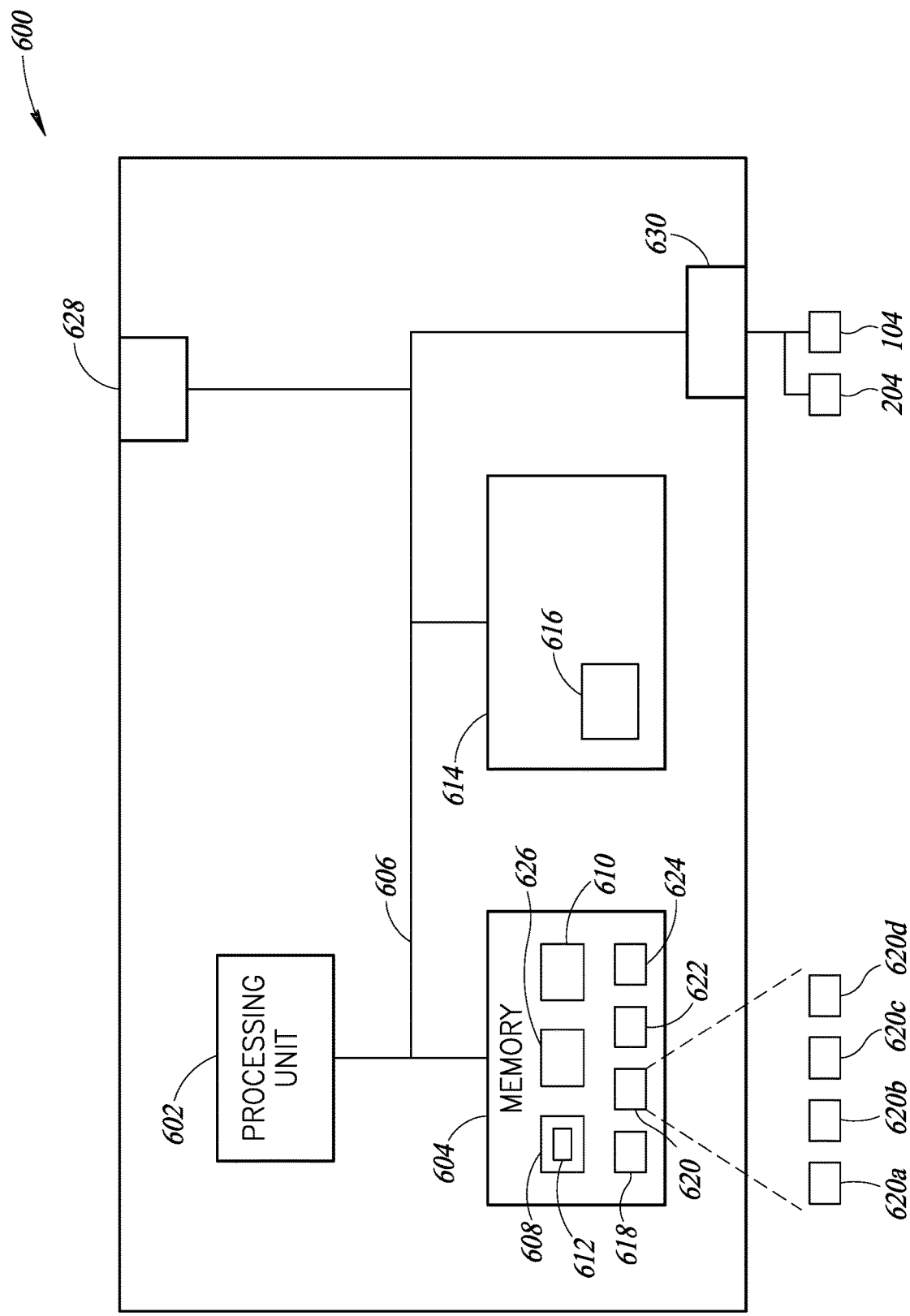
FIG. 6 is a block diagram that shows a controller that may include a processor and a communications subsystem, according to at least one illustrated implementation.

FIG. 6 shows a block diagram of a control system 600, according to at least one illustrated implementation. Such a control system 600 may be used as part of, or to implement, one or more of the controller 152 associated with the machine-readable symbol reader 100, for example. The control system 600 may take the form of any current or future developed computing system capable of executing one or more instruction sets. The control system 600 includes a processing unit 602, a system memory 604 and a system bus 606 that communicably couples various system components including the system memory 604 to the processing unit 602. The control system 600 will at times be referred to in the singular herein, but this is not intended to limit the embodiments to a single system, since in certain embodiments, there will be more than one system or other networked computing device involved. Non-limiting examples of commercially available systems include, but are not limited to, an Atom, Pentium, or 80×86 architecture microprocessor as offered by Intel Corporation, a Snapdragon processor as offered by Qualcomm, Inc., a PowerPC microprocessor as offered by IBM, a Sparc microprocessor as offered by Sun Microsystems, Inc., a PA-RISC series microprocessor as offered by Hewlett-Packard Company, an A6 or A8 series processor as offered by Apple Inc., or a 68xxx series microprocessor as offered by Motorola Corporation.

The processing unit 602 may be any logic processing unit, such as one or more central processing units (CPUs), microprocessors, digital signal processors (DSPs), application-specific integrated circuits (ASICs), field programmable gate arrays (FPGAs), programmable logic controllers (PLCs), etc. Unless described otherwise, the construction and operation of the various blocks shown in FIG. 6 are of conventional design. As a result, such blocks need not be described in further detail herein, as they will be understood by those skilled in the relevant art. In some implementations, some or all of the processing unit 602, the memory 604, and one or more other components discussed below may be included within a single integrated circuit, such as may occur, for example, with a system on chip (SoC).

The system bus 606 can employ any known bus structures or architectures, including a memory bus with memory controller, a peripheral bus, and a local bus. The system memory 604 includes read-only memory ("ROM") 608 and random access memory ("RAM") 610. A basic input/output system ("BIOS") 612, which can form part of the ROM 608, contains basic routines that help transfer information between elements within the control system 600, such as during start-up. Some implementations may employ separate buses for data, instructions and power.

The control system 600 also includes one or more internal nontransitory storage systems 614. Such internal nontransitory storage systems 614 may include, but are not limited to, any current or future developed persistent storage device 616. Such persistent storage devices 616 may include, without limitation, magnetic storage devices such as hard disc drives, electromagnetic storage devices such as memristors, molecular storage devices, quantum storage devices, electrostatic storage devices such as solid state drives, and the like.

The one or more internal nontransitory storage systems 614 communicate with the processing unit 602 via the system bus 606. The one or more internal nontransitory storage systems 614 may include interfaces or device controllers (not shown) communicably coupled between nontransitory storage system and the system bus 606, as is known by those skilled in the relevant art. The nontransitory storage systems 614 and associated storage devices 616 provide nonvolatile storage of computer-readable instructions, data structures, program modules and other data for the control system 600. Those skilled in the relevant art will appreciate that other types of storage devices may be employed to store digital data accessible by a computer, such as magnetic cassettes, flash memory cards, RAMs, ROMs, smart cards, etc.

Program modules can be stored in the system memory 604, such as an operating system 618, one or more application programs 620, other programs or modules 622, drivers 624 and program data 626.

The application programs 620 may include, for example, one or more machine executable instruction sets (i.e., machine-readable symbol detection 620a) capable of detecting machine-readable symbols 102 that are included, for example, within the field of view 122 of the scan engine 104. The application programs 620 may include, for example, one or more machine executable instruction sets (machine-readable symbol decoding library 620b) capable of decoding the machine-readable symbols that are scanned by the scan engine 104. The application programs 620 may include, for example, one or more machine executable instruction sets (trigger instructions 620c) capable of receiving a signal and transmitting a signal to the scan engine 104 to perform a scan within the field of view 122. The application program 620 may include, for example, one or more machine executable instruction sets (impact threshold instructions 620d) capable of receiving a signal and transmitting a signal to deactivate the couplers 136 on the wrist mount 106. The application programs 620 may be stored as one or more executable instructions.

In some embodiments, the control system 600 operates in an environment using one or more of the network interfaces 628 to optionally communicably couple to one or more remote computers, servers, display devices, via one or more communications channels. These logical connections may facilitate any known method of permitting computers to communicate, such as through one or more LANs and/or WANs. Such networking environments are well known in wired and wireless enterprise-wide computer networks, intranets, extranets, and the Internet.

Further, local communication interface 630 may be used for establishing communications with other components in a local device, such as may occur, for example, when the control system 600 is associated with the machine-readable symbol reader 100. For example, the local communication interface 630 may be used to communicate with the scan engine 104 by transmitting one or more signals to, and/or receiving one or more signals from, the scan engine 104 and/or the user input device 204.

Figure 7:
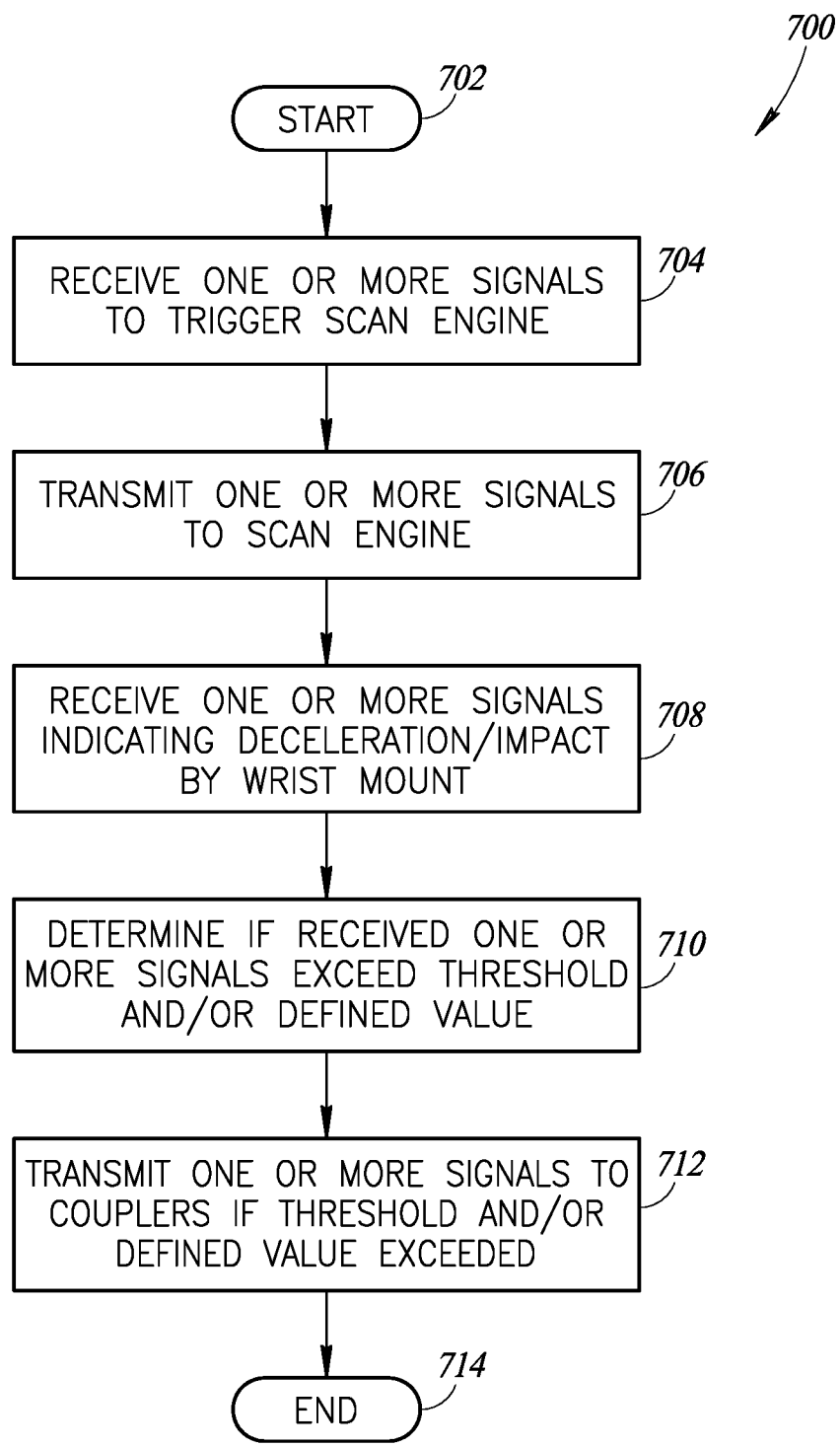
FIG. 7 is a logic flow diagram of a method of triggering a scan engine to perform a scan of a field of view, according to at least one illustrated implementation.

FIG. 7 is a logic flow diagram of a method 700 of triggering a scan engine to perform a scan of a field of view, according to at least one illustrated implementation. Method 700 starts at 702, at which a processor-based device, for example the controller 152, receives one or more signals.

At 704, a processor enabled component, such as the controller 152 and/or the control system 600, receives one or more signals. In some implementations, the signals may be received from the user input device 204, such as the user actuatable button 204a. The user input device 204 may produce one or more signals when activated, such as may occur, for example, when the user depresses or holds the user input device 204, such as the user actuatable button 204a. In some implementations, the user input device 204 may be comprised of one or more user actuatable buttons 204a or switches that may extend outward form one or more surfaces of the finger mount 102. For example, in some implementations, the user actuatable button 204a may extend outward from a surface of the finger mount 102 that faces towards a finger 202b that is adjacent to the finger 202a on which the finger mount 102 is mounted. In some implementations, the adjacent finger 202b may be the thumb of the user, which may facilitate the user depressing or otherwise activating the user actuatable button 204a. In such implementations, the user may be able to locate and depress the user input device 204 through feel, without the need to visually identify and/or locate the user input device 204.

In some implementations, the signals may be received from the presence sensor 124. Such a presence sensor 124 may have a field of view 126 that may encompass or at least partially overlap the field of view 122 of the scan engine 104. The presence sensor 124 may generate the signal when an object is detected within the field of view 126 of the presence sensor 124. Such a presence sensor 124 may include, for example, an emitter-collector pair that transmits a light, ultra-sonic, electromagnetic or other suitable signal towards the field of view 126 of the presence sensor 124 using an emitter and detects any amount of the transmitted signal that has reflected or returned from an object that is received at a collector. The signal may have a temporal or frequency or wavelength pattern imposed thereon, for example to facilitate detection of the returned signal from ambient signals. In some implementations, the presence sensor 124 may include one or more of a capacitive, photoelectric, inductive, or Hall Effect sensor that may be used to detect the presence of an object within the field of view 126. In some implementations, for example, the presence sensor 124 may detect the presence of an object based upon the amount of light that has been reflected from the object. The presence sensor 124 may generate the signal upon detecting the presence of an object within the field of view 126.

At 706, the processor enabled component upon receiving the one or more signals, for example, from the user input device 204 and/or the presence sensor 124, may transmit one or more signals to the scan engine 104. Such a processor enabled device may include, for example, the controller 152 and/or the control system 600. Such signals transmitted to the scan engine 104 may cause the scan engine 104 to scan within the field of view 122 of the scan engine 104. Such a scan may capture a representation of a machine-readable symbol that may be facing towards the scan engine 104 within the field of view 122. The scan engine 104 may transmit one or more signals related to the representation of the captured machine-readable symbol. Such signals may be transmitted, for example, to the decoding subsystem 150 that may be located at the controller 152, the control system 600, and/or a processor-enabled component located at a remote device.

At 708, the processor enabled component may receive one or more signals, for example, from the accelerometer 156. The accelerometer 156 may be physically coupled to and may move with the wrist mount 106. The accelerometer 156 may generate one or more signals based upon the acceleration of the accelerometer 156 (and thus the wrist mount 106) through three-dimensional space. In some instances, the accelerometer 156 may detect a sudden deceleration and/or force applied to the wrist mount 106, such as may occur, for example, when the wrist mount 106 impacts an object within the environment of the user. Such a sudden deceleration and/or force may thereby result in a signal that differs from the signals generated by the accelerometer 156 when the accelerometer 156 moves freely through space.

At 710, the processor enabled component may determine if the one or more signals received from, for example, the accelerometer 156 exceeds a defined and/or a threshold value. Such a defined and/or threshold value may be associated with a force being applied to the wrist mount 106 and/or an object, such as the power source 108, that may be physically coupled to the wrist mount 106. In such an implementation, the defined and/or threshold value may be set to be below a force that may be likely to cause damage to the wrist mount 106, the object (e.g., the power source 108) physically coupled to the wrist mount 106, and/or the objects within the environment surrounding the user. In some instances, such as those in which the objects in the surrounding environment are delicate or fragile, for example, the defined and/or threshold value may be set to correspond to a relatively low force to thereby protect such objects. In some instances, the defined and/or threshold value may be set to correspond to a relatively high force to prevent false positives from unnecessarily causing the object (e.g., the power source 108) to be de-coupled from the wrist mount 106.

At 712, the processor enabled component may transmit one or more signals to the couplers 136 upon determining at 710 that the one or more signals received at 708 exceed the defined and/or threshold value. Such one or more signals transmitted to the couplers 136 may cause the object, such as the power source 108, to be de-coupled from the wrist mount 106. In some instances, for example, the couplers 136 may be implemented by one or more electromagnets 136e, and the one or more signals transmitted by the processor enabled component may cause the one or more electromagnets 136e to deactivate, thereby decoupling the power source 108 from the wrist mount 106.

At 714, the method 700 terminates, for example until invoked again. Alternatively, the method 700 may repeat continuously or repeatedly, or may execute as multiple instances of a multi-threaded process.

The foregoing detailed description has set forth various implementations of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one implementation, the present subject matter may be implemented via Application Specific Integrated Circuits (ASICs). However, those skilled in the art will recognize that the implementations disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

Those of skill in the art will recognize that many of the methods or algorithms set out herein may employ additional acts, may omit some acts, and/or may execute acts in a different order than specified. The various embodiments described above can be combined to provide further embodiments. In addition, U.S. Pat. No. 9,349,047, entitled "Method for the Optical Identification of Objects in Motion," is incorporated herein by reference, in its entirety.

In addition, those skilled in the art will appreciate that the mechanisms taught herein are capable of being distributed as a program product in a variety of forms, and that an illustrative implementation applies equally regardless of the particular type of signal bearing media used to actually carry out the distribution. Examples of signal bearing media include, but are not limited to, the following: recordable type media such as floppy disks, hard disk drives, CD ROMs, digital tape, and computer memory.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. A machine-readable symbol reader, comprising:
a scan engine;
a finger mount coupled to the scan engine for movement therewith, the finger mount sized and dimensioned to accommodate at least a portion of one or more fingers therein, the coupling of the scan engine and the finger mount being at least one of a releasable latch or a releasable strap to releasably secure the scan engine to the finger mount;
a wrist mount sized and dimensioned to accommodate at least a portion of a wrist therein and to releasably secure the wrist mount to the wrist, the wrist mount further including an electrical interface to an external power source, the electrical interface including a number of couplers that are operable to detachably physically couple the external power source to an outer surface of the wrist mount and to selectively physically de-couple the external power source from the outer surface of the wrist mount when a deceleration force above a defined amount is applied to the external power source, wherein the number of couplers of the wrist mount including one or more electromagnets configured to be selectively activatable and deactivatable; and
a flexible substrate carrying one or more electrically conductive paths that extend between the wrist mount and at least one of the finger mount and the scan engine at least to provide power from the external power source to the scan engine;
an accelerometer configured to generates one or more signals based upon movement of the accelerometer, the accelerometer which is physically coupled to the wrist mount to move therewith; and
a controller communicatively coupled to the accelerometer and to the one or more electromagnets, the controller configured to receive the one or more signals generated by the accelerometer, and transmit one or more signals to the one or more electromagnets based at least upon the one or more signals received from the accelerometer, the one or more signals transmitted to the one or more electromagnets which trigger each of the one or more electromagnets to deactivate.

2. The machine-readable symbol reader of claim 1, further comprising:
the power source comprising a first battery having a size and dimension, and configured to be selectively, detachably coupleable to the one or more of the number of couplers of the wrist mount.

3. The machine-readable symbol reader of claim 2 wherein the external power source comprises a second battery having a size and dimension, the size and dimension of the second battery different from the size and dimension of the first battery, the first battery and the second battery each configured to be selectively, detachably coupleable to the wrist mount.

4. The machine-readable symbol reader of claim 2 wherein the first battery is connected to a display configured to present information based upon one or more signals received at the display.

5. The machine-readable symbol reader of claim 4 wherein the first battery includes a first surface and a second surface, the second surface separated from the first surface by a width of the first battery, and the second surface which faces towards the wrist mount when the first battery is coupled to the wrist mount, and wherein the display is located along the first surface.

6. The machine-readable symbol reader of claim 1 wherein the number of couplers on the wrist mount further include at least one of snaps, latches, Velcro, apertures, or posts.

7. The machine-readable symbol reader of claim 1 wherein the flexible substrate includes at least one of a flexible printed circuit board or a flexible textile.

8. The machine-readable symbol reader of claim 7 wherein the one or more electrically conductive paths carried by the flexible substrate include one or more of electrically conductive wires, insulated electrically conductive wires, or electrically conductive traces.

9. The machine-readable symbol reader of claim 1, further comprising:
a decoding subsystem communicatively coupled to the scan engine, the decoding subsystem configured to receive one or more signals from the scan engine, the one or more signals which are related to an image of a machine-readable symbol that encodes information, the decoding subsystem further operable to decode the information encoded by the machine-readable symbol.

10. The machine-readable symbol reader of claim 9, further comprising:
a wireless transmission subsystem communicatively coupled to the decoding subsystem and to a remote processor, the wireless transmission subsystem configured to receive one or more signals from the decoding subsystem, the one or more signals which are related to the decoded information decoded by the decoding subsystem, the wireless transmission subsystem further configured to wirelessly transmit the decoded information to the remote processor.

11. The machine-readable symbol reader of claim 10 wherein each of the decoding subsystem and the wireless transmission subsystem is physically coupled to the finger mount.

12. The machine-readable symbol reader of claim 9 wherein the decoding subsystem is physically coupled to the finger mount.

13. The machine-readable symbol reader of claim 1 wherein the finger mount further includes a user input device, the user input device which transmits a signal when activated by a user, the machine-readable symbol reader further comprising:
a controller communicatively coupled to the user input device and to the scan engine, the controller which upon receiving the signal from the user input device, transmits one or more signals to the scan engine, the one or more signals transmitted to the scan engine which trigger the scan engine to capture one or more images within a field-of-view of the scan engine.

14. The machine-readable symbol reader of claim 13 wherein the user input device is located along a first surface of the finger mount, the first surface which faces a first finger of a user when the finger mount is mounted on a second finger of the user, the first finger adjacent to the second finger.

15. The machine-readable symbol reader of claim 1, further comprising:
a presence configured to generate one or more signals responsive to detecting an object within the field-of-view; and
a controller communicatively coupled to the presence sensor and to the scan engine, the controller which upon receiving the one or more signals from the presence sensor, transmits one or more signals to the scan engine, the one or more signals transmitted to the scan engine which trigger the scan engine to capture one or more images within a field-of-view of the scan engine.

16. The machine-readable symbol reader of claim 1 wherein the finger mount is sized and dimensioned to receive a portion of a single finger therethrough.

17. The machine-readable symbol reader of claim 1 wherein the flexible substrate is a glove or a portion of a glove.

18. The machine-readable symbol reader of claim 1 wherein the finger mount includes a ring having a platform along which the scan engine is securely, detachably, physically coupled, and wherein the ring is sized and dimensioned to receive a finger of a user.

19. A method of operation of a machine-readable symbol reader, the machine-readable symbol reader which includes a scan engine, a finger mount to which the scan engine couples for movement therewith, the finger mount sized and dimensioned to accommodate at least a portion of one or more fingers therein, the coupling of the scan engine or the finger mount being at least one of a releasable latch or a releasable strap to releasably secure the scan engine to the finger mount, a wrist mount sized and dimensioned to accommodate at least a portion of a wrist therein and to releasably secure the wrist mount to the wrist, the wrist mount which includes an electrical interface to an external power source and a set of one or more couplers that selectively, detachably, physically couples the external power source to an outer surface of the wrist mount, and a flexible substrate, the flexible substrate which carries one or more electrically conductive paths that extend between the wrist mount and at least one of the finger mount and the scan engine at least to provide power from the external power source to the scan engine, the method comprising:
receiving one or more signals at a controller, the controller physically coupled to the wrist mount;
upon receiving the one or more signals, transmitting one or more signals to the scan engine, the one or more signals which cause the scan engine to perform a scan within a field of view of the scan engine;

upon receiving a deceleration force applied to the external power source, the force which is above a defined amount, decoupling the external power source from the outer surface of the wrist mount; and receiving at the controller a set of one or more signals from at least one of an accelerometer and a Hall sensor;

determining that the signals in the set of one or more signals are above a defined amount, the defined amount which is associated with a force being applied to the external power source; and upon determining that the signals are above the defined amount, transmitting one or more signals that cause the set of one or more couplers to decouple the external power source from the wrist mount.

20. The method of claim 19 wherein the one or more signals are received at the controller from at least one of a presence sensor or a user input device.

21. The machine-readable symbol reader of claim 1, wherein the controller is configured to transmit one or more signals to the one or more electromagnets based at least upon the one or more signals received from the accelerometer exceeding a predetermined threshold value.

22. A machine-readable symbol reader comprising:
a scan engine;
a finger mount coupled to the scan engine for movement therewith, the finger mount sized and dimensioned to accommodate at least a portion of one or more fingers therein;
a wrist mount sized and dimensioned to accommodate at least a portion of a wrist therein and to releasably secure the wrist mount to the wrist, the wrist mount further including an electrical interface to an external power source, the electrical interface including a number of couplers that are operable to detachably physically couple the external power source to the wrist mount and to selectively physically de-couple the external power source to the wrist mount when a force above a defined amount is applied to the external power source; and
a flexible substrate carrying one or more electrically conductive paths that extend between the wrist mount and at least one of the finger mount and the scan engine at least to provide power from the external power source to the scan engine, wherein one or more of the number of couplers of the wrist mount include one or more magnetic couplers positioned and magnetically oriented to couple with a set of complimentary magnetic couplers carried by the external power source, wherein the one or more magnetic couplers of the wrist mount include one or more electromagnets configured to be selectively activatable and deactivatable, the reader further comprising:
a magnetic field sensor coupled to the wrist mount and configured to detect the application of a force above a predetermined threshold; and
a controller communicatively coupled to the magnetic field sensor and to the one or more electromagnets, the controller configured to receive the one or more signals generated by the magnetic field sensor, and transmit one or more signals to the one or more electromagnets based at least upon the one or more signals received from the magnetic field sensor, the one or more signals transmitted to the one or more electromagnets which trigger each of the one or more electromagnets to deactivate.

* * * * *